(12) United States Patent
Flasza

(10) Patent No.: US 7,271,646 B2
(45) Date of Patent: Sep. 18, 2007

(54) LOOP POWERED PROCESS CONTROL INSTRUMENT POWER SUPPLY

(75) Inventor: Michael D. Flasza, Schaumburg, IL (US)

(73) Assignee: Magnetrol International, Inc., Downers Grove, IL (US)

( * ) Notice: Subject to any disclaimer, the term of this patent is extended or adjusted under 35 U.S.C. 154(b) by 306 days.

(21) Appl. No.: 10/670,036

(22) Filed: Sep. 23, 2003

(65) Prior Publication Data

US 2004/0061537 A1    Apr. 1, 2004

Related U.S. Application Data

(60) Provisional application No. 60/414,847, filed on Sep. 30, 2002.

(51) Int. Cl.
G05F 3/08    (2006.01)
G08C 19/00    (2006.01)

(52) U.S. Cl. .............................. 327/538; 363/74; 363/78

(58) Field of Classification Search ................ 327/535, 327/538, 540; 363/62, 282; 307/109
See application file for complete search history.

(56) References Cited

U.S. PATENT DOCUMENTS

| | | | |
|---|---|---|---|
| 5,187,474 A * | 2/1993 | Kielb et al. ............ | 340/870.18 |
| 5,457,421 A * | 10/1995 | Tanabe ....................... | 327/530 |
| 5,610,552 A * | 3/1997 | Schlesinger et al. ........ | 327/560 |
| 6,438,005 B1* | 8/2002 | Walter .......................... | 363/60 |
| 6,577,072 B2* | 6/2003 | Saito et al. .............. | 315/185 R |
| 6,650,555 B2* | 11/2003 | Suzuki et al. .................. | 363/60 |
| 6,686,831 B2* | 2/2004 | Cook et al. .................. | 323/273 |
| 7,046,180 B2* | 5/2006 | Jongsma et al. ............ | 341/141 |

* cited by examiner

*Primary Examiner*—Kenneth B. Wells
*Assistant Examiner*—Terry L. Englund
(74) *Attorney, Agent, or Firm*—Wood, Phillips, Katz, Clark & Mortimer

(57) ABSTRACT

A loop powered process instrument comprises a control circuit measuring a process variable and developing a control signal representing the process variable. An output circuit for connection to a two-wire process loop controls current on the loop in accordance with the control signal. A power supply circuit is connected to the output circuit and the control circuit for receiving power from the two-wire process loop and supplying power to the control circuit. The power supply comprises cascaded charge pump circuits.

20 Claims, 1 Drawing Sheet

LOOP POWERED PROCESS CONTROL INSTRUMENT POWER SUPPLY

CROSS-REFERENCE

This application claims priority of application No. 60/414,847 filed Sep. 30, 2002.

FIELD OF THE INVENTION

This invention relates to process control instruments, and more particularly, to a loop powered instrument power supply.

BACKGROUND OF THE INVENTION

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

An electrical transmitter must be connected to an electrical power source to operate. One form of such a transmitter, known as a four-wire transmitter, includes two terminals for connection to a power source and two terminals for carrying an output signal proportional to the process variable. This signal can be used as an input to a controller or for purposes of indication. Because the instrument is connected directly to a power source independent from the output signal, power consumption is a less critical factor in design and use of the same.

The use of a four-wire transmitter, as discussed above, requires the use of four conductors between the transmitter and related loop control and power components. Where transmitters are remotely located, such a requirement can be undesirable owing to the significant cost of cabling. To avoid this problem, instrument manufacturers have strived to develop devices known as two-wire, or loop powered, transmitters. A two-wire transmitter includes two terminals connected to a remote power source. The transmitter loop current, drawn from the power source, is proportional to the process variable. A typical instrument operates off of a 24 volt DC source and varies the signal current in the loop between four and twenty milliamps (mA) DC. Because of these operating requirements the design of the transmitter in terms of power consumption is critical. For example, when a low level signal of four milliamps is transmitted, there is minimal power available to be consumed by the instrument. Therefore, circuits must be designed to operate off of such minimal available power.

While low power circuits are continuously developed, there are ever increasing demands placed on performance capabilities of the process control instruments. For example, with a radar level measurement device, the instrument's performance is enhanced by more powerful digital signal processing techniques driven by a microcontroller. In addition to the microcontroller, there are several other circuits, such as the radar transceiver, which require electric power. To be successful, the design must use optimum processing capability and speed. This means making maximum power from the loop available to the electronics, and making efficient use of it.

Another important concept in industrial processes is that of intrinsic safety. Much industrial equipment is installed in so-called "hazardous locations" meaning that the environment of the installation includes volatile and/or combustible material that burn or explode if exposed to an ignition source. An intrinsic-safe design, in general, requires that the circuit not have energy storage elements that can create sufficient ignition energy. This places a design restriction on the electronics; namely, the circuit design must avoid the use of large values of inductance or capacitance. If large energy storage elements are used, then the instrument must use explosion proof enclosures or encapsulation of components.

The present invention is directed to solving one or more of the problems discussed above in a novel and simple manner.

SUMMARY OF THE INVENTION

In accordance with the invention, there is provided a loop powered process instrument which makes optimum use of available power.

Broadly, in accordance with one aspect of the invention, there is disclosed a loop powered process instrument comprising a control circuit measuring a process variable and developing a control signal representing the process variable. An output circuit for connection to a two-wire process loop controls current on the loop in accordance with the control signal. A power supply circuit is connected to the output circuit and the control circuit for receiving power from the two-wire process loop and supplying power to the control circuit. The power supply comprises cascaded charge pump circuits.

It is a feature of the invention that the charge pump circuit is comprised of divide-by-two charge pump circuits.

It is another feature of the invention that the charge pump circuits have an efficiency of about 95%.

It is still another feature of the invention that the power supply circuit comprises a current source connecting the cascaded charge pump circuits to the output circuit.

It is still a further feature of the invention that the power supply circuit comprises a regulator diode connected to the cascaded charge pump circuits and to the control circuit.

It is an additional feature of the invention that the power supply circuit has an input of about 13 volts and 3.5 mA and an output of about 3 volts and about 13 mA.

It is yet another feature of the invention that the power supply circuit has an efficiency of about 90%.

There is disclosed in accordance with another aspect of the invention a loop powered process instrument comprising a control circuit measuring a process variable and developing a control signal representing the process variable. An output circuit for connection to a two-wire process loop controls current on the loop in accordance with the control signal. A power supply circuit is connected to the output circuit and the control circuit for receiving power from the two-wire process loop and supplying power to the control circuit. The power supply circuit comprises a current source providing a select current to a plurality of cascaded switched capacitor voltage dividers.

It is a feature of the invention that the switched capacitor voltage dividers comprise CMOS switched capacitor voltage converters each having a pump capacitance and an output capacitance.

Further features and advantages of the invention will be readily apparent from the specification and from the drawings.

DETAILED DESCRIPTION OF THE INVENTION

Figure 1:
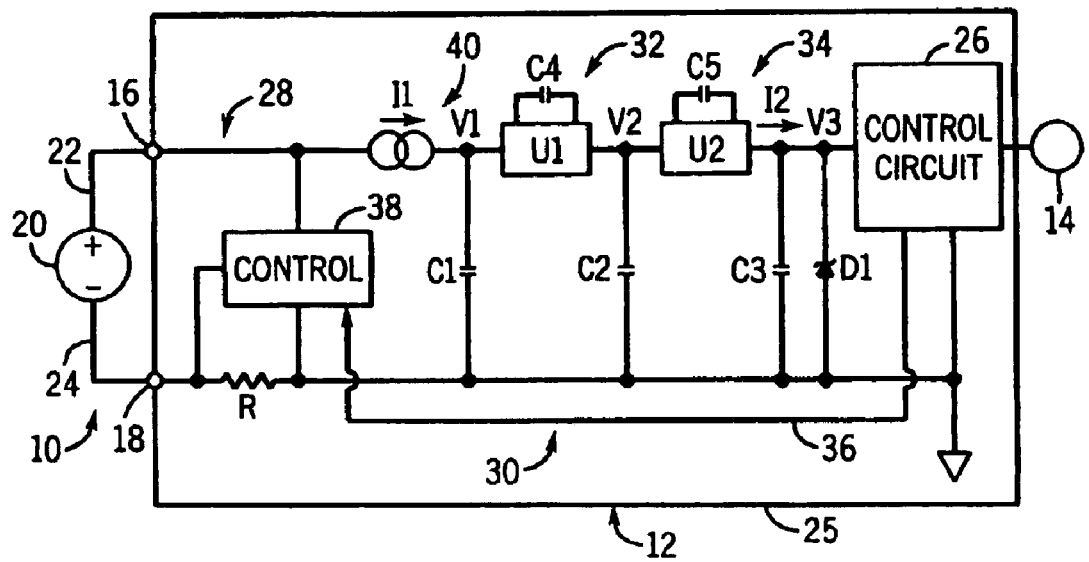
FIG. 1 is a combined electrical schematic/block diagram illustrating a loop powered process instrument in accordance with the invention.

Referring to FIG. 1, an industrial process loop 10 utilizes a loop powered process instrument 12 in accordance with the invention. The process instrument 12 includes a primary element 14 which senses the value of a process variable. The instrument 12 includes two terminals 16 and 18 connecting to a remote power source 20 by two wires 22 and 24, respectively, thus the name two-wire loop. The power source 20 is typically in the range of 15 to 30 volts DC and most typically is about 24 volts DC. The instrument 12 varies the signal current in the loop between 4 mA and 20 mA DC.

The instrument 12 may be used for sensing numerous different process variables, such as, for example, level, flow, pressure, temperature, etc. Likewise, the instrument 12 can utilize virtually any technique for measurement that is capable of using low power. Thus, the present invention is not intended to be limited to any particular type of instrument or measurement technique, as will be apparent.

The instrument 12 comprises a housing, represented by the outline 25, including a control circuit in the form of instrumentation electronics 26 connected to the primary element 14. The control circuit 26 measures the process variable using the primary element 14 and develops a control signal on a line 36 representing the process variable. An output circuit 28 is connected to the terminals 16 and 18 for connection of the instrument 12 in the two-wire process loop 10. Particularly, the output circuit 28 controls current on the loop 10 in accordance with the control signal on the line 36. A power supply circuit 30 is connected to the output circuit 28 and the control circuit 26 for receiving power from the two-wire process loop 10 and supplying power to the control circuit 26. The power supply circuit comprises cascaded charge pump circuits 32 and 34. As noted above, industrial process control loops commonly power the loop devices from a source of 24 volt DC. However, the full 24 volt DC is rarely available to the device. The current loop may include a sense resistor of several hundred Ohms. The 24 volt DC supply may itself have a tolerance on the order of 5%. Intrinsic safety barriers may further reduce the available loop voltage. As a result, it is not uncommon to require device operation with as little as 15 volts DC available for operation.

The control circuit 26 may generally be of any known design for measuring a process variable and developing a control signal representing the process variable, as discussed above. In the illustrated embodiment of the invention, the control circuit 26 requires an operating voltage on the order of 3 volts DC. Other voltage requirements are possible, in accordance with the invention.

The output circuit 28 is conventional in nature and includes a control block 38 in series with a sense resistor R and the power source 20. The control block 38 is also connected across the sense resistor R to sense loop current in the conventional manner. The control block 38 receives the control signal on the line 36. The control block 38 controls the 4-20 mA loop current in proportion to the measured process variable in accordance with the control signal on the line 36, as is well known.

Prior art loop powered process instruments may use a current source, such as a 3.5 mA current source, to provide power to electronic circuitry. The value 3.5 mA is chosen as a representative value since the full 4 mA is not used because some margin must be allowed to maintain full control of the loop at the low limit of 4 mA. One known approach is to connect a capacitor and regulator diode between the current source and the instrument electronics. However, such a power supply may have an efficiency of only about 20%. Another known design uses a standard switching power supply connected in a voltage step down configuration. Such a design, while being of higher efficiency, has the disadvantage that it requires large inductors and/or capacitors.

The present invention uses two divide-by-two charge pump circuits 32 and 34 cascaded to provide a 3 volt DC supply to the control circuit 26. The input to the control circuit 26 is about 3 volts DC. Efficiency of each charge pump circuit 32 and 34 is about 95% so that overall circuit efficiency is about 90%.

Figure 2:
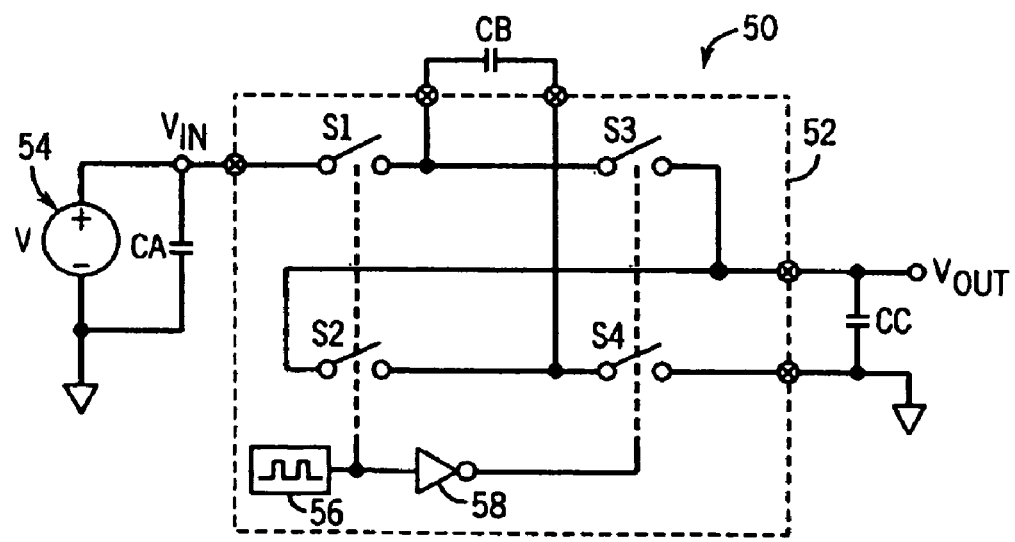
FIG. 2 is an equivalent schematic diagram of a charge pump circuit for the process instrument of FIG. 1.

Referring to FIG. 2, an equivalent diagram for a charge pump circuit 50 used as a building block for the charge pump circuits 32 and 34 of FIG. 1, is illustrated. The charge pump circuit 50 uses a switched-capacitor voltage converter 52 having internal switches S1, S2, S3 and S4. A voltage supply 54 is connected to an input terminal Vin. An input capacitor CA is connected across the supply 54. The switches S1 and S3 are connected in series between the input terminal Vin and an output terminal Vout. The switches S2 and S4 are connected in series between the Vout terminal and ground. An external pump capacitor CB is connected across the junction between the switches S1 and S3 and the junction between the switches S2 and S4. An output capacitor CC is connected between the output terminal and ground. An internal clock 56 operates the switches S1 and S2 simultaneously and is connected by an inverter 58 to the switches S3 and S4.

The charge pump circuit 50 operates by alternately closing S1 and S2, then S3 and S4, under control of the internal clock 56. When the switches S1 and S2 are closed, charge supplied by the input DC supply is stored on the pump capacitor CB. Later, the switches S1 and S2 open and the switches S3 and S4 are closed, transferring or "pumping" charge from the pump capacitor CB onto the output capacitor CC. In an exemplary embodiment of the invention, the capacitors CA, CB and CC comprise 0.1 uF capacitors. In this configuration, the charge pump 50 forms a Vout=Vin/2 function, also known as divide-by-two. In this configuration, at power levels of 50 mW or less, as the case with loop powered devices, efficiencies of 95% are achievable.

Referring again to FIG. 1, the power supply circuit 30 comprises a 3.5 mA current source 40, represented by a current I1, connected to the cascaded charge pump circuits 32 and 34. A regulator diode D1 is connected at the junction of the charge pump circuit 34 and the control circuit 26.

The first charge pump circuit 32 comprises a first switched-capacitor voltage converter U1 connected to the current source 40 to receive an input voltage V1. A capacitor C1 provides the input capacitance of the charge pump 32. A capacitor C4 provides the pump capacitance. A capacitor C2 comprises an output capacitor. An output voltage is indicated as V2.

The second charge pump circuit 34 includes a second switched-capacitor voltage converter U2 connected to the output of the first converter U1 and having the capacitor C2 as an input capacitance. A capacitor C3 comprises the output capacitance. A capacitor C5 comprises the pump capacitance. The output of the second charge pump circuit is labeled V3.

In the power supply circuit 30 the current source 40 provides the available power from the 24 volt DC power source 20, nominally 13 volts DC, to the first converter U1. The voltage developed at the converter U1 input is filtered by the capacitor C1 and then divided by two. The output of the converter U1 is filtered by the capacitor C2, and becomes the input to the converter U2. The charge pump switches, S1-S4 in FIG. 2, have finite (non-zero) resistance, so there is some small voltage loss across each of the converters U1 and U2, so that the output is slightly less than one half the input. The output of the second converter U2 is filtered by the capacitor C3. The zener diode D1 acts as a regulator/clamp for the output voltage. Thus the output V3 is on the order of 3 volts DC and available current I2 to the control circuit 26 is about 13.6 mA. If the load of the control circuit 26 is less than approximately 13.6 mA, then the output voltage V3 of the second converter U2 tends to rise because the current input I1 to the system is constant at 3.5 mA. At light or no load, the regulator diode D1 turns on and holds the output of the second converter U2 to about 3 volts DC.

In practice, the load of the control circuits 26 will vary. Up to three volts DC/13.6 mA is available to the control circuits 26. If the current requirement is less, then the regulator diode D1 will absorb the remainder. The output of the first converter U1 will stabilize at about 6.4 volts DC, and the input of the first converter U1 will stabilize at about 13 volts DC.

In the illustrated embodiment of the invention, the first converter U1 might be a Maxim MAX1044 switched-capacitor voltage converter, which can handle the 13 volts required at its input, while the second converter U2 might be a Maxim MAX829 switched-capacitor voltage converter, which only receives about 6.4 volts at its input.

Thus, in accordance with the invention, there is provided a high efficiency power supply circuit operating off of low power input using cascaded divide-by-two charge pump circuits.

I claim:

1. A loop powered process instrument comprising:
   a control circuit measuring a process variable and developing a control signal representing the process variable;
   an output circuit, for connection to a two-wire process loop, for controlling current on the loop in accordance with the control signal; and
   a power supply circuit, connected to the output circuit, and the control circuit for receiving power from the two-wire process loop and supplying power to the control circuit, wherein the power supply circuit comprises cascaded charge pump circuits.

2. The loop powered process instrument of claim 1 wherein the charge pump circuits comprise divide-by-two charge pump circuits.

3. The loop powered process instrument of claim 1 wherein the charge pump circuits each have an efficiency of about 95%.

4. The loop powered process instrument of claim 1 wherein the power supply circuit comprises a current source connecting the cascaded charge pump circuits to the output circuit.

5. The loop powered process instrument of claim 1 wherein the power supply circuit comprises a regulator diode connecting an output of the cascaded charge pump circuits and to the control circuit.

6. The loop powered process instrument of claim 1 wherein the power supply circuit has an input of about 13 volts and 3.5 mA and an output of about 3 volts and about 13 mA.

7. The loop powered process instrument of claim 1 wherein the power supply circuit has an overall efficiency of about 90%.

8. A loop powered process instrument comprising:
   a control circuit measuring a process variable and developing a control signal representing the process variable;
   an output circuit, for connection to a two-wire process loop, for controlling current on the loop in accordance with the control signal; and
   a power supply circuit, connected to the output circuit and the control circuit, for receiving power from the two-wire process loop and supplying power to the control circuit, wherein the power supply circuit comprises a current source providing a select current to a plurality of cascaded switched capacitor voltage dividers.

9. The loop powered process instrument of claim 8 wherein the switched capacitor voltage dividers comprise divide-by-two charge pump circuits.

10. The loop powered process instrument of claim 8 wherein the switched capacitor voltage dividers each have an overall efficiency of at least 90%.

11. The loop powered process instrument of claim 8 wherein the switched capacitor voltage dividers each have an efficiency of about 95%.

12. The loop powered process instrument of claim 8 wherein the power supply circuit comprises a regulator diode connecting an output of the cascaded switched capacitor voltage dividers to the control circuit.

13. The loop powered process instrument of claim 8 wherein the power supply circuit has an input of about 13 volts and 3.5 mA and an output of about 3 volts and about 13 mA.

14. The loop powered process instrument of claim 8 wherein the power supply circuit has an overall efficiency of about 90%.

15. The loop powered process instrument of claim 8 wherein the switched capacitor voltage dividers comprise CMOS switched capacitor voltage converters each having a pump capacitance and an output capacitance.

16. In a loop powered process instrument including a control circuit measuring a process variable and developing a control signal representing the process variable and an output circuit for connection to a two-wire process loop for controlling current on the loop in accordance with the control signal, the improvement comprising:
   a power supply circuit, connected to the output circuit and the control circuit, for receiving power from the two-wire process loop and supplying power to the control circuit, wherein the power supply circuit comprises a plurality of cascaded switched capacitor voltage dividers.

17. The loop powered process instrument of claim 16 wherein the improvement comprises two cascaded divide-by-two charge pump circuits, as the plurality of cascade switched voltage dividers each having an efficiency of about 95%.

18. The loop powered process instrument of claim 16 wherein the switched capacitor voltage dividers comprise CMOS switched capacitor voltage converters each having a pump capacitance and an output capacitance.

19. The loop powered process instrument of claim 16 wherein the power supply circuit has an input of about 13 volts and 3.5 mA and an output of about 3 volts and about 13 mA.

20. The loop powered process instrument of claim 16 wherein the power supply circuit comprises a current source connected to the cascaded switched capacitor voltage dividers to the output circuit and a regulator diode connecting an output of the cascaded switched capacitor voltage dividers to the control circuit.

* * * * *